US012706684B2

(12) United States Patent
McCarthy

(10) Patent No.: US 12,706,684 B2
(45) Date of Patent: Aug. 11, 2026

(54) PRECISELY CAPTURING TIME OF AN EVENT IN PROCESSING CIRCUITRY OF AN OPTICAL MODULE

(71) Applicant: Ciena Corporation, Hanover, MD (US)

(72) Inventor: Andrew McCarthy, Stittsville (CA)

(73) Assignee: Ciena Corporation, Hanover, MD (US)

( * ) Notice: Subject to any disclaimer, the term of this patent is extended or adjusted under 35 U.S.C. 154(b) by 205 days.

(21) Appl. No.: 18/655,599

(22) Filed: May 6, 2024

(65) Prior Publication Data

US 2025/0343612 A1 Nov. 6, 2025

(51) Int. Cl.
*H04J 3/06* (2006.01)
*H04B 10/61* (2013.01)
*H04L 7/00* (2006.01)

(52) U.S. Cl.
CPC ............ *H04J 3/0667* (2013.01); *H04B 10/61* (2013.01); *H04L 7/0075* (2013.01)

(58) Field of Classification Search
CPC ....... H04B 10/61; H04J 3/0667; H04L 7/0075
See application file for complete search history.

(56) References Cited

U.S. PATENT DOCUMENTS 7,769,305 B1 * 8/2010 Roberts ................. H04L 7/0075 398/208
10,050,736 B2 * 8/2018 Nagarajan .............. H04B 10/40
10,313,103 B1 * 6/2019 Perras .................. H04B 10/516
10,594,395 B2 * 3/2020 Abdullah ........... H04B 10/0773
11,038,610 B2 6/2021 Gareau et al.
11,356,188 B2 * 6/2022 He ........................ H04L 69/323
11,552,722 B2 * 1/2023 Gareau ................. H04J 3/1652
11,916,661 B2 * 2/2024 Gareau ................. H04J 3/0667
2020/0028585 A1 * 1/2020 Abdullah ............. H04L 7/0075
2020/0412471 A1 * 12/2020 Gareau ................. H04J 3/0697
2022/0190946 A1 * 6/2022 Gareau ................... H04J 3/067
2023/0006759 A1 1/2023 McCarthy et al.
2024/0080178 A1 * 3/2024 McCarthy ............. H04L 7/0331

* cited by examiner

*Primary Examiner* — Mohammed Abdelraheem
(74) *Attorney, Agent, or Firm* — Baratta Law PLLC; Lawrence A. Baratta, Jr.

(57) ABSTRACT

An optical module includes a receiver configured to receive an optical signal, and processing circuitry configured to obtain data associated with the optical signal, periodically generate a reference signal, at a first point in the processing circuitry, each reference signal has an associated time, detect a significant event requiring a timestamp at a second point in the processing circuitry, and utilize a corresponding reference signal and its associated bit offset to determine the timestamp for the significant event. The first point is after the optical signal is converted to the data as bits, but where there is no data awareness.

20 Claims, 2 Drawing Sheets

PRECISELY CAPTURING TIME OF AN EVENT IN PROCESSING CIRCUITRY OF AN OPTICAL MODULE

FIELD OF THE DISCLOSURE

The present disclosure relates generally to networking. More particularly, the present disclosure relates to systems and methods for precisely capturing time of an event in processing circuitry, in an optical module.

BACKGROUND OF THE DISCLOSURE

Precision Time Protocol (PTP), defined by the IEEE 1588 standard, is used for precise time synchronization of devices in packet-based networks. In routers, obtaining a precise timestamp for PTP is critical to ensure that the time reported is as accurate as possible, especially considering new applications such as 5G which are sensitive to latency. Further, it is desirable to obtain the timestamp for an event as close to the interface as possible. In a router, switch, or other network device, there is an optical interface (e.g., an optical modem, transceiver, transponder, pluggable optical module, etc.) that receives traffic over a physical link. Optical modules are configured to implement modulation/demodulation, Forward Error Correction (FEC) processing, Digital Signal Processing (DSP), Electro-Optical (EO) conversions, Serializing/Deserializing, gearboxing (changing data width), etc., as well as possible protocol processing, such as Media Access Control (MAC) layer processing, transcoding, etc. With optical modules, a significant event (e.g., a PTP packet) can arrive at the interface, i.e., from the line as an optical signal, but it may not be detected for timestamping purposes until after modifications in the data (e.g., FEC parity removal), due to all of the aforementioned processing, thereby causing timing uncertainty in the timestamp. One possible solution might be to add an estimate of the delay in any timestamp, but this does not help because the timing uncertainty is variable, e.g., the significant event can be anywhere in the bit stream, FEC processing can be vary in time, etc. Stated differently, optical modules perform complex processing and there is timing variability there with such that identification of a significant event for timestamping purposes can add timing uncertainty.

BRIEF SUMMARY OF THE DISCLOSURE

The present disclosure relates to systems and methods for precisely capturing time of an event in processing circuitry, in an optical module. In particular, the present disclosure is a circuit-based implementation for increasing the accuracy of timestamping in an environment where there is no protocol awareness and therefore no ability to determine a reference point. The environment is the input at an optical receiver, i.e., there is no awareness of underlying data at the input (the interface from the line). Rather, the underlying data has to undergo various processing. The present disclosure periodically adds a reference on the input and keeps track of a difference between the reference and when a significant event is detected. When the significant event occurs, the timestamp is taken and it can be adjusted by the difference to provide an accurate value as to what the timestamp was when the significant event occurred at the input, rather than later when detected in the processing. By carrying the periodic reference signal alongside the data, through First-In-First-Out (FIFOs), and other circuitry, it experiences exactly the same delay as the data with none of the uncertainty estimating the number of retimes would have. By keeping a count of bits since the latest reference pulse, data add/drop modifications are exactly accounted for. This count only needs to be available at one point in the data flow rather than at every retime stage, saving logic. Advantageously, the present disclosure lowers timing uncertainty on timestamp values, such as for PTP.

ITU-T defines classes of devices for telecom boundary clocks, with each class having a tighter time error threshold that needs to be met. With the techniques described herein, a device can reduce its time error enough to achieve a more restrictive class than it would by not supporting these techniques.

In an example embodiment, an optical module includes a receiver configured to receive an optical signal, and processing circuitry configured to obtain data associated with the optical signal, periodically generate a reference signal, at a first point in the processing circuitry, each reference signal has an associated time, detect a significant event requiring a timestamp at a second point in the processing circuitry, and utilize a corresponding reference signal and its associated bit offset to determine the timestamp for the significant event.

The first point can be after the optical signal is converted to the data as bits, but where there is no protocol awareness. There can be variable delay between the first point and the second point based on data modification in the processing circuitry, such that the corresponding reference signal and its associated bit offset is utilized to determine an adjustment of the timestamp for compensation thereof. The processing circuitry can be further configured to implement any of clock domain crossing, gearboxing, adding or dropping bits in the data, protocol processing, and Forward Error Correction (FEC) processing between the first point and the second point.

The processing circuitry can be further configured to send the periodically generated reference signal with the data from the first point to the second point. There can be variable delay between the first point and the second point based on data modification in the processing circuitry, and wherein the periodically generated reference signal experiences a same variable delay as the significant event, enabling compensation thereof.

The processing circuitry can be further configured to maintain one or more bit counters and utilize the one or more bit counters to account for a difference between time associated with the corresponding reference signal and the significant event. The significant event can be based on Precision Time Protocol (PTP). The optical signal can be modulated using coherent modulation. The optical signal can be modulated using Pulse Amplitude Modulation (PAM) and variants thereof.

In another example embodiment, a method includes steps of obtaining data associated with an optical signal; periodically generating a reference signal, at a first point in processing circuitry, each reference signal has an associated time; detecting a significant event requiring a timestamp at a second point in the processing circuitry; and utilizing a corresponding reference signal and its associated bit offset to determine the timestamp for the significant event.

The first point can be after the optical signal is converted to the data as bits, but where there is no protocol awareness. There can be variable delay between the first point and the second point based on data modification in the processing circuitry, such that the corresponding reference signal and its associated bit offset is utilized to determine an adjustment of the timestamp for compensation thereof. The steps can further include implementing any of clock domain crossing, gearboxing, adding or dropping bits in the data, protocol processing, and Forward Error Correction (FEC) processing between the first point and the second point.

The steps can further include sending the periodically generated reference signal with the data from the first point to the second point. There can be variable delay between the first point and the second point based on data modification in the processing circuitry, and wherein the periodically generated reference signal experiences a same variable delay as the significant event, enabling compensation thereof.

The steps can further include maintaining one or more bit counters and utilizing the one or more bit counters to account for a difference between time associated with the corresponding reference signal and the significant event. The significant event can be based on Precision Time Protocol (PTP). The optical signal can be modulated using coherent modulation. The optical signal can be modulated using Pulse Amplitude Modulation (PAM) and variants thereof.

BRIEF DESCRIPTION OF THE DRAWINGS

The present disclosure is illustrated and described herein with reference to the various drawings, in which like reference numbers are used to denote like system components/method steps, as appropriate, and in which.

DETAILED DESCRIPTION OF THE DISCLOSURE

Figure 1:
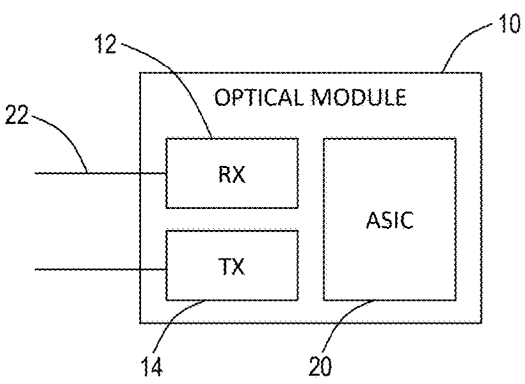
FIG. 1 is a block diagram of an optical module which includes a receiver, a transmitter, and processing circuitry.

Again, the present disclosure relates to systems and methods for precisely capturing time of an event in processing circuitry, in an optical module. FIG. 1 is a block diagram of an optical module 10 which includes a receiver 12, a transmitter 14, and processing circuitry 20. Those skilled in the art will recognize FIG. 1 is a functional view. Practical embodiments of the optical module 10 can include, without limitation, a pluggable optical module, a transceiver, a modem, a transponder, a line card, a blade, etc. The optical module 10 can be based on a standard as well as a proprietary vendor implementation. Examples of pluggable optical modules include Quad Small form Factor Pluggable (QSFP) and variants thereof, Octal SFP (OSFP) and variants thereof, C-form Factor Pluggable (CFP) and variants thereof, and the like. The term module is not meant to limit the optical module 10 to a single unit in a housing, but rather can mean any physical implementation whether pluggable or not, standardized or not, etc.

In a typical embodiment, the optical module 10 is located in a switch, router, or other type of network device for purposes of transmitting and receiving data. The transmitter 14 includes various optical and electrical components for optically transmitting data from the optical module 10. The receiver 12 includes various optical and electrical components for optically receiving data to the optical module 10. That is, the Rx 12 and Tx 14 can include one or more ports for interfacing to other nodes in an optical network. The processing circuitry 20 is configured to interface to both the receiver 12 and the transmitter 14 for electrical signal processing. That is, the receiver 12 and the transmitter 14 can be viewed as an optical front end and the processing circuitry 20 can be viewed as the electrical domain.

The optical module 10 can support various protocols as well, such as ZR, ZR+, etc., as well as client side interfaces such as Gigabit Attachment Unit Interface (GAUI), Flexible Optical (FlexO) Interface (FOIC), etc. Also, the optical module 10 can support various modulation approaches including coherent modulation, Pulse Amplitude Modulation (PAM) at various levels (e.g., PAM4), and the like. The present disclosure focuses on the receive side, where data is being optically received on an optical interface 22 at the receiver 12, provided to the processing circuitry 20, and processed therein. The present disclosure focuses on a circuit implementation in the processing circuitry 20 for increasing the accuracy of timestamping of significant events received by the receiver 12.

An optical signal is received by the receiver 12 on the optical interface 22. Of note, while the present disclosure refers to the optical signal, those skilled in the art will recognize it could be an electrical signal, i.e., the optical interface 22 can be an electrical interface. The optical signal carries underlying data and can be modulated as, e.g., a Quadrature Amplitude Modulated (QAM) signal, a Pulse Amplitude Modulated (PAM) signal, or the like. The optical signal can also be encoded in various protocols, such as, e.g., ZR, ZR+, Optical Transport Network (OTN), Flexible OTN (FlexO), Flexible Ethernet (FlexE), Metro Transport Networking (MTN), and the like. In an example use case, there is packet data contained within the protocol and modulated as the optical signal. The packet data can include PTP packets that need a timestamp.

Figure 2:
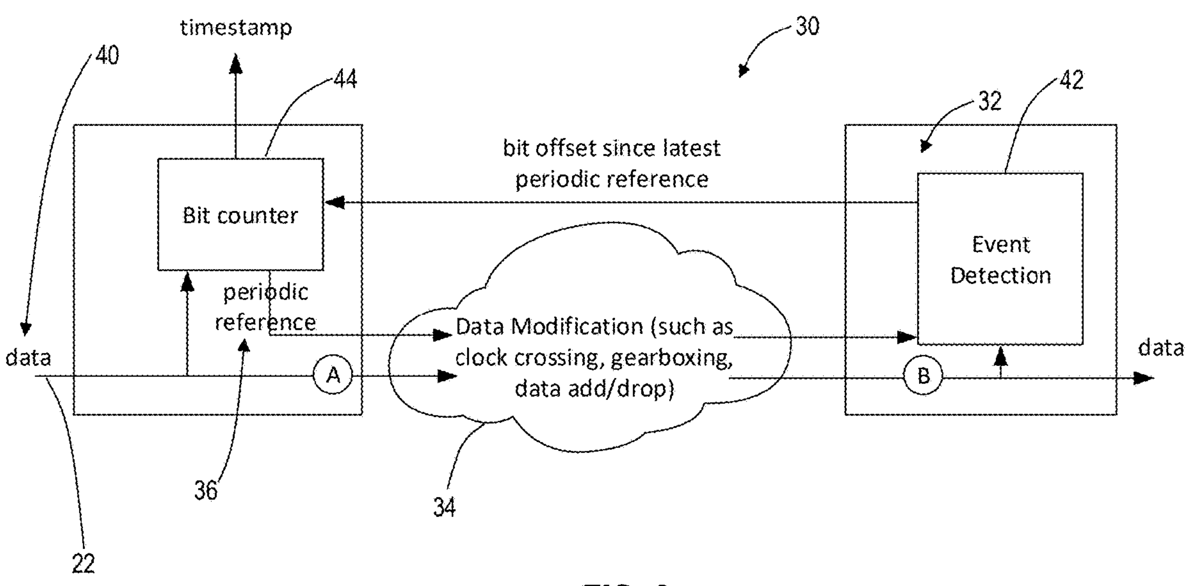
FIG. 2 is a block diagram of a timestamping system that is implemented in the processing circuitry of the optical module.

FIG. 2 is a block diagram of timestamping system 30 that is implemented in the processing circuitry 20 of the optical module 10. In particular, FIG. 2 illustrates a functional view with the various components in the timestamping system 30 being implemented in electrical processing circuitry. In various embodiment, the present disclosure utilizes the term "significant event", and this means when the timestamp should be taken. A PTP packet can be an example of a significant event, and those skilled in the art will appreciate other use cases also exist. The present disclosure deals with precisely capturing the time of the significant event. For PTP or other significant events, it is desirable to capture a time for the timestamp of the significant event as close to the interface 22 as possible. That is, for a PTP packet being received by the optical module 10, we want to capture the time for the timestamp as soon as the PTP packet is received on the interface 22.

However, the significant event cannot be detected until various processing occurs in the optical module 10, and specifically in the processing circuitry 20. For example, with a PTP packet, the significant event cannot be detected until the Ethernet header is viewable, which means the data must have been processed to the point that the MAC layer is visible. This is necessarily downstream of the desired time capture location. In FIG. 2, we want to detect the time for the significant event at step A, but due to the processing requirements, we can only detect the significant event at step B.

Again, the data being received at the interface 22 is optically modulated (e.g., QAM, PAM, etc.), includes parity (FEC), includes a protocol (e.g., ZR, ZR+, OTN, FlexO, FlexE, MTN, etc.), but ultimately we want to detect a PTP packet at the MAC layer. There is a requirement for the optical module 10 to perform optical demodulation, OE conversion, Analog-to-Digital Conversion (ADC), transcoding (e.g., 64/66b to 256/257b line encoding), Serializing/

Deserializing, gearboxing (changing data width), FEC processing, protocol processing, and the like.

This may be further complicated if the data must cross clock domains, experiences gearboxing (that is, a change in data width), data overhead or parity is added or removed from the stream, or other such data manipulation is performed between the interface 22 and the location that the significant event is visible (step B).

Again, timing uncertainty can be X nanoseconds, i.e., the timing difference between steps A, B. Also, this uncertainty is variable meaning it is not possible to simply add a value to every timestamp taken at step B to compensate for this timing uncertainty. For example, in one instance, a PTP packet or other significant event may be located at different locations in an optical frame, with parity data for FEC. So, the PTP packet may be detected at the beginning of FEC processing or anywhere in the process. Also, again, with the present disclosure, it is possible to achieve timing uncertainty of around order of magnitude or less from X nanoseconds, which is critical for next generation applications.

The present disclosure includes a process to capture a time of a significant event where it is visible, namely at the step B with event detection logic 32 in the processing circuitry 20. Again, the time at the step B is delayed compared to the desired capture location due to data modification 34 in the processing circuitry 20. However, the process includes an adjustment to the time at the step B based on a periodic reference signal 36 that is generated (periodically) at the step A, which is an upstream location from the event detection logic 32 and is unaffected by the delay to the data modification 34.

To do this, at the location where you would ideally capture the time of the significant event, the periodic reference signal 36 is generated. This can be simply a pulse that is generated every time a counter or clock reaches a predetermined value. Importantly, step A is located when bits are first received by the processing circuitry 20, i.e., from the OE conversion process associated with the receiver 12. However, the step A is before any electrical processing of the bits. This location can be viewed as one of the earliest possible locations to detect events in the underlying data. The periodic reference signal 36 introduces a reference in an environment in which there is no data awareness and therefore normally no reference point.

We can refer to these bits as data 40 which are sent through the processing circuitry 20. The periodic reference signal 36 is sent downstream through the processing circuitry 20 along with the data 40, experiencing the same delays through the device as the data 40. A time or timestamp is taken for each of the periodic reference signals 36 and this can be used to later adjust any time needed for a significant event, at the step B. Of note, the periodic reference signal 36 is processed downstream along with the data 40 and these are bits experiencing the same delay due to the data modification 34. So it is possible to use the delta between the periodic reference signal 36 and the significant event for adjustment upstream.

By keeping track of the number of bits between a bit tied to one of the periodic reference signals 36 and a bit tied to a significant event detected by the event detection logic 32, the time of the significant event can be precisely determined at the interface 22, e.g., the timestamp captured upstream at A can be adjusted precisely by the number of bit times.

Downstream, at the event detection logic 32 capable of detecting the significant event, there is a bit counter 42 that increments by the data bus width every active clock cycle and resets to zero whenever a periodic reference signal 36 is seen. When a significant event is detected at the event detection logic 32, this bit counter 42, plus the bit offset at which the significant event was detected, is captured. This results in a precise bit offset between the latest periodic reference signal and the significant event.

This significant event bit offset is then passed upstream to the source of the periodic reference signal 36. There is also a bit counter 44 at this location that also increments by the data bus width every active clock cycle and resets to zero on generation of a new periodic reference signal 36. The next time this bit offset is equal to the bit offset where the significant event occurred, a timestamp is captured. This capture will occur exactly one periodic reference period later than the time the actual significant event would have been seen at when it was at this location in the dataflow. The timestamp can then be modified by subtracting exactly one period from it to get an accurate time value of the original significant event at this place in the dataflow.

Of note, the foregoing describes an example implementation. Those skilled in the art will appreciate other implementations are also contemplated consistent with the present disclosure. That is, the present disclosure contemplates generating exact timestamps when bits are first available, detecting a significant event after a given exact timestamp with the significant event having been detected based on some delay due to processing, and using a bit difference between an exact timestamp and the significant event to provide a precise timestamp for the significant event. For example, we detect the significant event 1000 bits after the last periodic reference signal 36. So, we determine the precise time of the significant event as being the time associated with the last periodic reference signal 36 plus the time for the 1000 bits.

Note this approach still works even if the data 40 crosses clock domains, experiences gearboxing, or other manipulation such as dropping FEC parity between the periodic reference signal 36 and the significant event detection. When data is added/dropped, the bit count can be adjusted at appropriate time events corresponding to these add/drop of data by the amount of data added or removed. For gearboxing, the period of the periodic reference signal 36 can be chosen to be a common multiple of both sides for ease of implementation. Crossing clock domains is a non-issue so long as the periodic reference signal experiences the same delay as the data, which happens because it is carried as a signal alongside the data.

That is, by carrying the periodic reference signal 36 alongside the data 40, through FIFOs, etc., it experiences exactly the same delay as the data with none of the uncertainty estimating the number of retimes would have. By keeping a count of bits since the latest periodic reference signal 36, data add/drop modifications are exactly accounted for. This count only needs to be available at one point in the data flow rather than at every retime stage, saving logic.

Process

Figure 3:
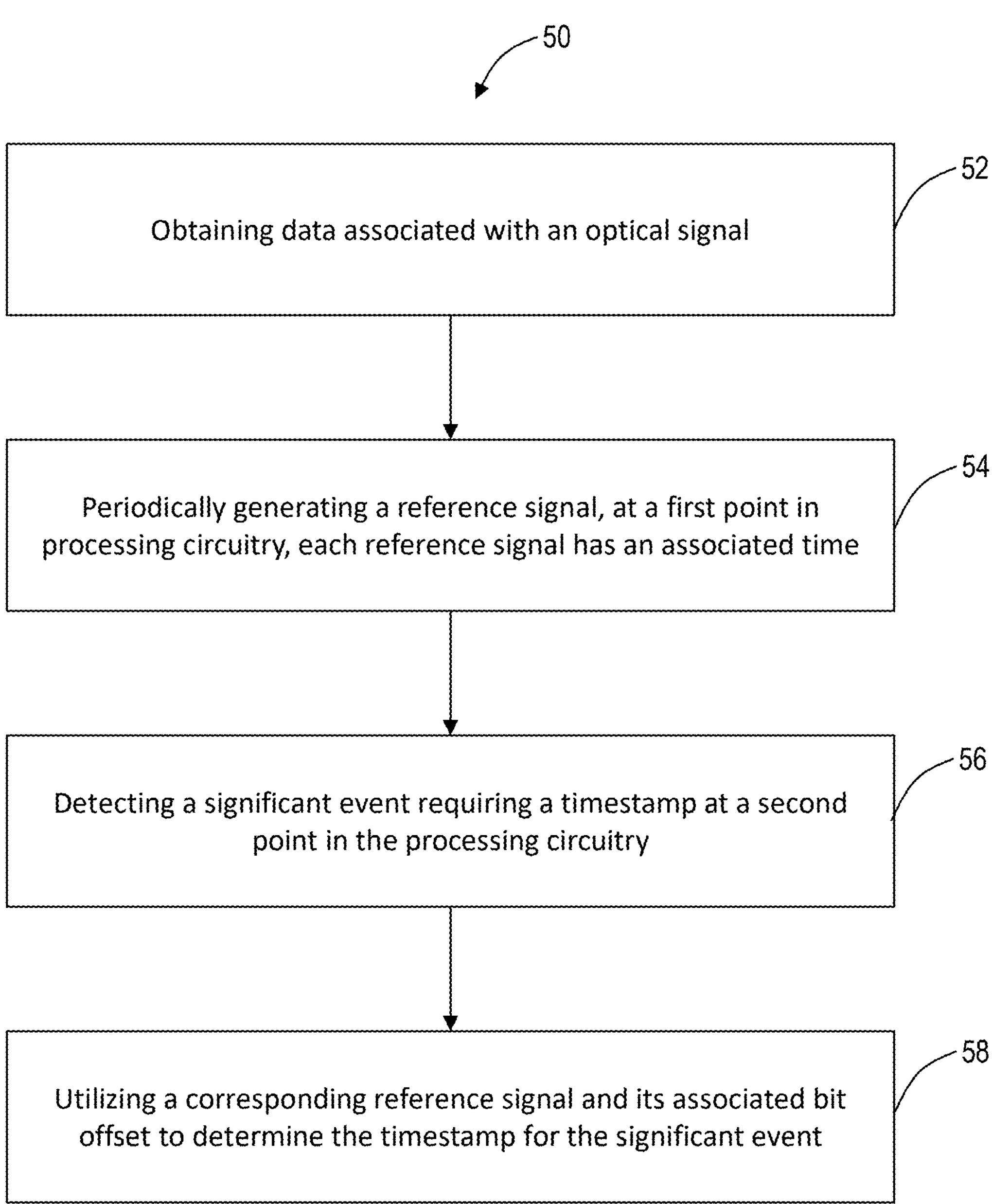
FIG. 3 is a flowchart of a process for precisely capturing time of an event in processing circuitry, such as in an optical module.

FIG. 3 is a flowchart of a process 50 for precisely capturing time of an event in processing circuitry, such as in an optical module. The process 50 contemplates implementation as a method having steps, via the optical module 10 or the processing circuitry 20 configured to implement the steps, etc.

The process 50 includes obtaining data associated with an optical signal (step 52); periodically generating a reference signal, at a first point in processing circuitry, each reference signal has an associated time (step 54); detecting a significant event requiring a timestamp at a second point in the processing circuitry (step 56); and utilizing a corresponding reference signal and its associated bit offset to determine the timestamp for the significant event (step 58).

The first point is after the optical signal is converted to the data as bits, but where there is no protocol awareness. For example, the first point is at the step A in FIG. 2, before the data modification. We say there is no data awareness because the data at this point is recovered from the optical signal and requires processing in the processing circuitry 20 to be able to detect packets, MAC layer data, or anything related to the significant event.

Also, there is variable delay between the first point and the second point based on data modification in the processing circuitry, such that the corresponding reference signal and its associated time is utilized to determine an adjustment of the timestamp for compensation thereof. This is why we need the reference signal and its associated time, instead of trying to add some estimated value. For the data modification, the processing circuitry can be configured to implement any of clock domain crossing, gearboxing, adding or dropping bits in the data, protocol processing, and Forward Error Correction (FEC) processing between the first point and the second point.

The process 50 can further include sending the periodically generated reference signal with the data from the first point to the second point. Again, there is variable delay between the first point and the second point based on data modification in the processing circuitry, and wherein the periodically generated reference signal experiences a same variable delay as the significant event, enabling compensation thereof.

The process 50 can further include maintaining one or more bit counters and utilizing the one or more bit counters to account for a difference between data associated with the corresponding reference signal and the significant event. The significant event can be based on Precision Time Protocol (PTP). The optical signal can be modulated using coherent modulation, Pulse Amplitude Modulation (PAM) and variants thereof, and the like.

CONCLUSION

It will be appreciated that some embodiments described herein may include one or more generic or specialized processors ("one or more processors") such as microprocessors; Central Processing Units (CPUs); Digital Signal Processors (DSPs): customized processors such as Network Processors (NPs) or Network Processing Units (NPUs), Graphics Processing Units (GPUs), or the like; Field Programmable Gate Arrays (FPGAs); and the like along with unique stored program instructions (including software and/or firmware) for control thereof to implement, in conjunction with certain non-processor circuits, some, most, or all of the functions of the methods and/or systems described herein. Alternatively, some or all functions may be implemented by a state machine that has no stored program instructions, or in one or more Application-Specific Integrated Circuits (ASICs), in which each function or some combinations of certain of the functions are implemented as custom logic or circuitry. Of course, a combination of the aforementioned approaches may be used. For some of the embodiments described herein, a corresponding device in hardware and optionally with software, firmware, and a combination thereof can be referred to as "circuitry configured or adapted to," "logic configured or adapted to," "a circuit configured to," "one or more circuits configured to," etc. perform a set of operations, steps, methods, processes, algorithms, functions, techniques, etc. on digital and/or analog signals as described herein for the various embodiments.

Although the present disclosure has been illustrated and described herein with reference to embodiments and specific examples thereof, it will be readily apparent to those of ordinary skill in the art that other embodiments and examples may perform similar functions and/or achieve like results. All such equivalent embodiments and examples are within the spirit and scope of the present disclosure, are contemplated thereby, and are intended to be covered by the following claims. Further, the various elements, operations, steps, methods, processes, algorithms, functions, techniques, modules, circuits, etc. described herein contemplate use in any and all combinations with one another, including individually as well as combinations of less than all of the various elements, operations, steps, methods, processes, algorithms, functions, techniques, modules, circuits, etc.

What is claimed is:

1. An optical module comprising a receiver configured to receive an optical signal, and processing circuitry configured to:

obtain data associated with the optical signal, periodically generate a reference signal, at a first point in the processing circuitry where bits are first available from the receiver and prior to electrical processing that provides protocol awareness, each generated reference signal has an associated reference time, detect a significant event requiring a timestamp at a second point in the processing circuitry, and identify a latest one of the periodically generated reference signals preceding the significant event, determine a bit offset representing a number of bits between the latest reference signal and the significant event, and utilize the reference time associated with the latest reference signal and the bit offset to determine the timestamp for the significant event.

2. The optical module of claim 1, wherein the first point is after the optical signal is converted to the data as bits, but where there is no protocol awareness.

3. The optical module of claim 1, wherein there is variable delay between the first point and the second point based on data modification in the processing circuitry, such that the latest reference signal and the bit offset representing the number of bits between the latest reference signal and the significant event is utilized to determine an adjustment of the timestamp for compensation thereof.

4. The optical module of claim 1, wherein the processing circuitry is further configured to implement any of clock domain crossing, gearboxing, adding or dropping bits in the data, protocol processing, and Forward Error Correction (FEC) processing between the first point and the second point.

5. The optical module of claim 1, wherein the processing circuitry is further configured to send the periodically generated reference signal with the data from the first point to the second point such that the periodically generated reference signal propagates alongside the data through the processing circuitry and experiences the same delay as the data associated with the significant event.

6. The optical module of claim 5, wherein there is variable delay between the first point and the second point based on data modification in the processing circuitry, including at least one of clock domain crossing, gearboxing, or adding or dropping bits, and wherein the periodically generated reference signal experiences a same variable delay as the significant event, enabling compensation thereof.

7. The optical module of claim 1, wherein the processing circuitry is further configured to maintain one or more bit counters and utilize the one or more bit counters to account for a bit offset representing a number of bits between the latest reference signal and the significant event.

8. The optical module of claim 1, wherein the significant event is based on Precision Time Protocol (PTP).

9. The optical module of claim 1, wherein the optical signal is modulated using coherent modulation.

10. The optical module of claim 1, wherein the optical signal is modulated using Pulse Amplitude Modulation (PAM).

11. A method comprising steps of:

obtaining data associated with an optical signal;

periodically generating a reference signal, at a first point in processing circuitry where bits are first available from the receiver and prior to electrical processing that provides protocol awareness, each generated reference signal has an associated reference time;

detecting a significant event requiring a timestamp at a second point in the processing circuitry; and identifying a latest one of the periodically generated reference signals preceding the significant event, determine a bit offset representing a number of bits between the latest reference signal and the significant event, and utilize the reference time associated with the latest reference signal and the bit offset to determine the timestamp for the significant event.

12. The method of claim 11, wherein the first point is after the optical signal is converted to the data as bits, but where there is no protocol awareness.

13. The method of claim 11, wherein there is variable delay between the first point and the second point based on data modification in the processing circuitry, such that the latest reference signal and the bit offset representing the number of bits between the latest reference signal and the significant event is utilized to determine an adjustment of the timestamp for compensation thereof.

14. The method of claim 11, wherein the steps further include implementing any of clock domain crossing, gearboxing, adding or dropping bits in the data, protocol processing, and Forward Error Correction (FEC) processing between the first point and the second point.

15. The method of claim 11, wherein the steps further include sending the periodically generated reference signal with the data from the first point to the second point such that the periodically generated reference signal propagates alongside the data through the processing circuitry and experiences the same delay as the data associated with the significant event.

16. The method of claim 15, wherein there is variable delay between the first point and the second point based on data modification in the processing circuitry, including at least one of clock domain crossing, gearboxing, or adding or dropping bits, and wherein the periodically generated reference signal experiences a same variable delay as the significant event, enabling compensation thereof.

17. The method of claim 11, wherein the steps further include maintaining one or more bit counters and utilizing the one or more bit counters to account for a bit offset representing a number of bits between the latest reference signal and the significant event.

18. The method of claim 11, wherein the significant event is based on Precision Time Protocol (PTP).

19. The method of claim 11, wherein the optical signal is modulated using coherent modulation.

20. The method of claim 11, wherein the optical signal is modulated using Pulse Amplitude Modulation (PAM).

* * * * *